United States Patent [19]

Auer et al.

[11] Patent Number: 4,585,809
[45] Date of Patent: Apr. 29, 1986

[54] RESIN BINDERS FOR FOUNDRY MOLDING SANDS

[75] Inventors: Heinz-Jochen Auer, Gross-Gerau; Wolfgang Klesse, Mainz; Peter Quis; Walther W. Szubinski, both of Darmstadt, all of Fed. Rep. of Germany

[73] Assignee: Röhm GmbH, Darmstadt, Fed. Rep. of Germany

[21] Appl. No.: 579,148

[22] Filed: Feb. 10, 1984

[30] Foreign Application Priority Data

Feb. 17, 1983 [DE] Fed. Rep. of Germany ....... 3305361

[51] Int. Cl.$^4$ .............................. C08K 3/36; C09K 3/00
[52] U.S. Cl. ..................................... 523/139; 523/142; 523/409; 524/529; 524/535; 524/531; 524/833; 524/831; 524/808; 524/824
[58] Field of Search ............... 523/131, 139, 142, 146, 523/409; 524/833, 531, 535, 529, 808, 824, 831

[56] References Cited

U.S. PATENT DOCUMENTS

| | | | |
|---|---|---|---|
| 2,817,128 | 12/1957 | Wickett | 523/139 |
| 3,007,893 | 11/1961 | Tepas | 523/139 |
| 3,679,703 | 7/1972 | Conrady | 523/139 |
| 4,033,922 | 7/1977 | Baron | 524/833 |
| 4,045,399 | 8/1977 | Suzuki | 524/833 |
| 4,105,618 | 8/1978 | Sifferman | 523/131 |
| 4,106,944 | 8/1978 | Epstein | 523/139 |
| 4,138,380 | 2/1979 | Barabas | 524/833 |
| 4,138,381 | 2/1979 | Chang | 524/833 |
| 4,183,759 | 1/1980 | Epstein | 523/139 |
| 4,278,581 | 7/1981 | Nakazawa | 523/139 |
| 4,388,438 | 6/1983 | Knypl | 524/833 |

FOREIGN PATENT DOCUMENTS

| | | |
|---|---|---|
| 1032896 | 6/1958 | Fed. Rep. of Germany . |
| 2453879 | 5/1975 | Fed. Rep. of Germany . |
| 2927108 | 1/1980 | Fed. Rep. of Germany . |
| 0103253 | 8/1980 | Japan .................................. 523/139 |
| 1494090 | 12/1977 | United Kingdom . |
| 406616 | 11/1973 | U.S.S.R. . |

OTHER PUBLICATIONS

Plastics Technical Dictionary, Wittfoht, Carl Hanser Verlag, Munich (1959) p. 58.
J. Macromol. Sci.-Chem. A4(6) Oct. 1979, p. 1327.
The Chemistry of Acrylonitrile, 29 Edn., American Cyanamide Company, p. 36.
Chem. Abstr. 86, 94030k.
Chem. Abstr. 54, 924312.
Chem. Abstr. 85, 196289y (1976).
Chem. Abstr. 85, 196291t (1976).
Chem. Abstr. 81, 53540e.
Chem. Abstr. 80, 18472s.
Chemical Abstracts 98, 73330r (1983).
Dictionary of Science and Technology, Collocott et al., W & R Chambers, p. 290.

*Primary Examiner*—C. Warren Ivy
*Attorney, Agent, or Firm*—Curtis, Morris & Safford

[57] ABSTRACT

An aqueous dispersion of a copolymer comprising:
(A) from 20 to 90 percent by weight of an unsaturated carboxylic acid of the formula

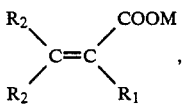

where $R_1$, $R_2$, $R_3$ are hydrogen, alkyl, or $-(CH_2)_n$ COOM and M is a proton or an alkali metal or alkaline earth metal or an ammonium cation, and
(B) from 10 to 80 percent of at least one other comonomer different from and copolymerizable with A; methods of making a ready-to-use foundry molding sand by mixing such a dispersion with sand; and such ready-to-use foundry molding sands.

17 Claims, No Drawings

RESIN BINDERS FOR FOUNDRY MOLDING SANDS

The present invention relates to aqueous dispersions of polymeric synthetic resins, particularly to such dispersions useful as binders for ready-to-use heat-curable foundry molding sands, and to such ready-to-use foundry molding sands and methods for making the same.

In industry, polymeric binders are used in the making of molds and mold cores from foundry molding sands for use in metal casting. As a rule, the molding sands are formulated with the binders, usually furan resins or phenolic resins, in such a way that the quartz sand grains, in an initially warm state, are coated with a thin film of binder. The sand formulations so prepared are then fully cured in an appropriate metal implement such as a core box, at temperatures between 150° and 300° C., within a short time which may range from 60 to 180 seconds, for example. After removal, the shaped parts, for example, mold core and shell, are hard, stable and ready for industrial use.

The polymeric binders are generally used in the form of solutions, less frequently as dispersions or emulsions.

Acrylic resins have also been proposed in the past as polymeric binders. From published Japanese patent application 76 93725 (Chem. Abstr. 85, 196291t) for example, it is known to process an emulsion polymer comprising 60 parts of methyl methacrylate, 38 parts of butyl acrylate, 2 parts of methacrylic acid, and 100 parts of water into a molding sand with 4 parts of water glass and 100 parts of sand. The nonvolatile component of the binder is said to represent from 0.1 to 5 weight percent, based on the sand.

According to published Japanese patent application 76 93722, 0.3 kg of an emulsion polymer made from 52 parts of styrene, 44 parts of butyl acrylate, 4 parts of methacrylic acid, 100 parts of water, initiator, and emulsifier mixed with 10 kg of sand is said to make a good foundry molding sand.

Published Japanese patent application 73 15771 (Chem. Abstr. 80, 184725) discloses the addition of alkylpolyacrylate binders to sand and cement. The use of 100 g of a polymethacrylate emulsion per 1000 g of sand and 100 g of portland cement is given as an example.

The use of dissolved polymers is known from a number of patent publications. According to published Japanese patent application 76 93723 (Chem. Abstr. 86, 94030k), from 1 to 10 weight percent of a synthetic resin powder and from 0.5 to 30 weight percent of a solvent of low boiling point may be admixed with the sand.

USSR patent 406,616 (Chem. Abstr. 81, 53540) recommends the use of a 10–15% aqueous solution of a methacrylic acid/dialkylmaleate copolymer as a binder.

From published German patent application DOS 1,032,896, it is known to use polyacrylic acid or copolymers with up to 50% of styrene or of vinyl acetate in aqueous solution as a binder for foundry molding sands.

Nowadays there are serious objections of both an ecological and economic nature to the use of organic solvents as vehicles for polymeric binders for foundry sands.

The use of solutions of polymeric binders in water has been proposed as an alternative. The selection of monomers, by quality and quantity, is limited rather severely by the requirements of water solubility. Also, polymer solutions necessarily have a relatively high viscosity. In order that they may be satisfactorily worked into the sands, their viscosity must be reduced; in other words, they must be appropriately diluted.

While the use of emulsion polymers has also been proposed in the past, the polymer types considered for this use lack satisfactory binder properties.

The principal requirements which polymeric binders for heat curing foundry molding sands must meet today are:

(1) high dimensional accuracy of molds and cores;
(2) high resistance to erosion by molten metal;
(3) a mold and core surface that is as smooth and as pore-free as possible;
(4) hardness and handleability after removal, for example while still warm;
(5) little need to clean the castings;
(6) ease of removability of the core sand after casting;
(7) reusability of the sand;
(8) high curing rates and complete cure;
(9) usability in automated production; and
(10) minimal evolution of noxious gases, which is of primary importance in this connection.

These requirements are met by a binder which is an aqueous dispersion of a copolymer comprising:

(A) from 20 to 90 percent, by weight of the copolymer, of at least one unsaturated carboxylic acid of the formula

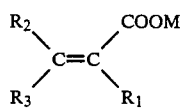

wherein

M is a proton or an alkali metal or alkaline earth metal or an ammonium cation;

$R_1$, $R_2$, and $R_3$ are, independent of each other, hydrogen, alkyl having 1 to 6 carbon atoms, or —$(CH_2)_n$—COOM, where n is 0 or 1, but where no more than two —COOM groups are present and where those groups —COOM wherein M is an alkali metal or alkaline earth metal cation are no more than 20 percent by weight of all groups —COOM in the polymer; and (B) from 10 to 80 percent of at least one further monomer, different from and copolymerizable with (A).

"Sand" within the meaning of the present invention means the usual refractory, granular base substance consisting of washed and classified quartz sand, and in some cases also of chromite, zirconium, or olivine sands. In addition, grog, magnesite, stillimanite, or corundum materials are used. (Grain diameters are mostly in the range between 0.1 and 0.5 mm).

By definition, the copolymer of the invention is present in aqueous dispersion, that is to say, its composition is based in every case on its dispersibility in an aqueous phase. The copolymer preferably has a minimum film forming temperature (MFT) in conformity with DIN 53787 of less than 100° C. Moreover, it preferably has a glass transition temperature $T_{\lambda max}$ in conformity with DIN 53445/DIN 7724 greater than 150° C.

Under certain conditions, the deflection temperature (heat distortion point) or the glass transition temperature of the copolymer can be influenced in a predictable manner by proper selection of the monomers and their proportions. [See Vieweg-Esser, Kunststoffhandbuck ("Plastics Handbook"), vol. IX, Polymethacrylates, pp. 333–340; Carl Hanser Verlag, 1975.]

A factor that is material to the invention is that the copolymer has a relatively high content of carboxyl groups —COOM (M=H) or of carboxylate groups (M=alkali metal or ammonium cation or alkaline earth metal cation, in the latter case combined with an anion) such that the amount of the carboxylic acid monomers of the aforementioned formula which carry the —COOM groups should not be less than 20 weight percent of all the monomers of the copolymer and may amount to as much as 90 weight percent thereof. The amount of carboxylate groups with alkali metal or alkaline earth metal cations should not be more than 20 percent of the —COOM groups contained in the copolymer.

The $R_1$, $R_2$ and $R_3$ groups in the aforementioned formula, if they do not represent or contain —COOM groups, preferably are hydrogen or methyl.

Maleic acid, fumaric acid, and itaconic acid, and especially acrylic acid and methacrylic acid are particularly well suited for use as unsaturated carboxylic acid monomers. The copolymer may advantageously contain various different monomers of this type, designated as (A) monomers.

The components (B) of the copolymer are, by definition, monomers which are copolymerizable with (A), in other words, monomers susceptible of free radical polymerization. They may be represented by the formula

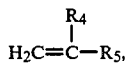

for example, wherein $R_4$ is hydrogen or methyl; $R_5$ is —COOR$_6$ or —CONR$_7$R$_8$, phenyl or alkyl-substituted phenyl, —(CH$_2$)$_m$—O—R$_9$, —CH=CH$_2$, or an inert heterocyclic group; $R_6$ is alkyl having from 1 to 18 carbon atoms; $R_7$ and $R_8$ are, independently of each other, hydrogen or alkyl having from 1 to 18 carbon atoms; and $R_9$ is alkyl having from 1 to 6 carbon atoms or

wherein $R_{10}$ is alkyl having from 1 to 5 carbon atoms.

The components (B) of the copolymer can optionally also comprise other monomers containing a functional group which is capable of non-radical crosslinking by reacting with another functional group or by reacting with a multifunctional non-radically crosslinking agent (which itself is not susceptible of radical polymerisation) at a temperature above 60° centigrade. Said monomers containing a functional group capable of non-radical crosslinking preferably are from 0.3 to 30 percent by weight more preferably from 0.5 to 20 percent by weight of said copolymer.

The components (B) of the copolymer thus fall into the groups (a) acrylic and methacrylic acid esters with $C_1$ to $C_{18}$ alcohols, and especially with $C_1$ to $C_8$ alcohols, and more particularly methyl methacrylate, methyl acrylate, ethyl acrylate, ethyl methacrylate, butyl acrylate, butyl methacrylate, and ethylhexyl acrylate;

(b) acrylic and methacrylic acid amides, and amides which are $C_1$-$C_8$ alkyl-substituted on the nitrogen, and more particularly methacrylamide and especially acrylamide;

(c) monomers containing a functional group capable of non-radical crosslinking and which are different from (a) and (b);

(d) styrene and alkylated styrenes, for example alpha-methylstyrene, and styrenes which have been alkylated in the nucleus, for example, para-methylstyrene;

(e) vinyl ethers and vinyl esters, and particularly the methylvinyl to hexylvinyl ethers, as well as vinyl acetate, vinyl propionate, and vinyl butyrate;

(f) heterocyclic vinyl compounds such as vinylpyridine, vinylpyrrolidone, vinylimidazole, and vinyl carbazole, and particularly the N-vinyl compounds; and (g) butadiene.

It is apparent that the composition of component (B) is not particularly critical so long as it corresponds to the definitions and characteristics set forth.

Component (B) is advantageously composed of several monomers. Particularly preferred are the derivatives of acrylic and methacrylic acid, that is to say, their esters and amides, and especially methyl methacrylate and ethyl acrylate.

In a particularly preferred embodiment, the copolymer of the invention thus is formed of (A) acrylic acid and/or methacrylic acid in amounts from 20 to 90 weight percent, and (B) acrylic and/or methacrylic acid esters, or acrylamides and/or methacrylamides, or both, optionally together with heterocyclic vinyl compounds. The acrylate and/or methacrylate ester monomers preferably represent more than 70 weight percent of component (B). Particularly preferred is an embodiment in which the ratio between the components (A) and (B), as defined immediately above, is about 1:1.

Of particular interest is copolymerisation of monomers of type (c). Such monomers containing a functional group which is capable of non-radical crosslinking by reacting with another functional group or by reacting with a multifunctional non radically crosslinking agent at a temperature above 60° centigrade are known per se.

Functional groups which qualify are hydroxy-, epoxy-, N-methylolamide and ethers derived thereof and so called "blocked" isocyanate groups, besides amide, carboxy and ester groups. Crosslinking in this case will either occur through a condensation reaction (e.g. by elimination of water, alcohol, amine or formaldehyde) or through an addition reaction (e.g. by nucleophilic attack at an epoxide or a "blocked" isocyanate function). Particularly preferred are derivatives of acrylic and methacrylic acid containing such functional groups.

These may be represented by the formula

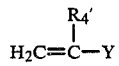

for example, wherein $R_4'$ is hydrogen or methyl, Y is a group

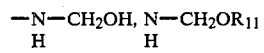

or a group —Q—$R_{14}$—Z wherein, Q is oxygen or —NHR$_{12}$, B is an optionally branched hydrocarbon chain having from 1 to 8 carbon atoms, Z is a hydroxy group or a group

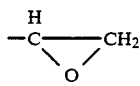

or a group —NHR$_{13}$, and R$_{11}$, R$_{12}$ and R$_{13}$ are alkyl having from 1 to 8 carbon atoms.

The monomers capable of non-radical crosslinking preferably comprise from 0.3 to 30 percent by weight of the copolymer.

A prerequisite for crosslinking in the present case is evidently the presence of at least two partners within different chains of the copolymer, which partners will crosslink by condensation or addition reaction in a temperature range beginning at 60° C. (and ranging up to 200° C.).

In addition to such partners, crosslinking may require the presence of a multifunctional non-radically crosslinking agent which itself is not susceptible of radical polymerization, but which will react with the partners mentioned above at 60° C. and above. Such crosslinking agents are known per se.

They must provide at least two functional groups, e.g. hydroxy, epoxy, (blocked) isocyanato, or amino groups fixed to a spacing unit, ordinarily a hydrocarbon chain. The hydrocarbon backbone may contain from 2 to 10$^3$, preferably 2 to 20, carbon atoms with a minimum of 2 functional groups and a maximum number of functional groups equal to the number of carbon atoms in the backbone of the molecule. A certain proportion of —CH$_2$— units may be replated by ether functions in the backbone of the agents, without impairing their function.

In general the partners engaged in crosslinking, i.e. different monomers, or monomers and multifunctional non-radically crosslinking agents, should be present in a molar ratio of from 20:1 to 1:1.

Multifunctional non-radically crosslinking agents with at least two isocyanate groups in the molecule preferably are utilized with the isocyanate groups "masked" or "blocked". Such blocking entities comprise the addition products of a diisocyanate with a polyol, in particular of 2,4- or 2,6-toluylene diisocyanate with a triol such as CH$_3$CH$_2$C(CH$_2$OH)$_3$, which react with phenol to yield phenyl urethanes.

Such "blocked isocyanates" are commerciady available, e.g. under the registered tradename DESMODUR AP. The epoxy polymers formed by the reaction between bisphenol A and epichlorohydrin are polyepoxy compounds useful in crosslinking, e.g. EPIKOTE 1-001, having an $\overline{MW}=900$.

As mentioned above, the condensation or addition reactions involved in non-radical crosslinking preferably comprise reaction between the following functional groups:

| in the monomer | in the multifunctional non-radically crosslinking agent |
|---|---|
| (i) —COOR<br>R = alkyl | (v) $\overset{O}{\underset{\|}{HO-CH_2NH-C-}}$ |
| (ii) —COOH | (vi) HO—CH$_2$— |
| (iii) —CH$_2$OH | (vii) $\overset{H}{\underset{}{HC-\!\!\!-C-}}$<br>$\diagdown O \diagup$ |
| (iv) $\overset{O}{\underset{\|}{-C-NHCH_2OH}}$ | (viii) blocked isocyanate |

The main modes of reaction will most likely comprise:
(i) with (iii), (iv), (v), (vi), or (vii);
(ii) with (iii), (iv), (v), (vi), (vii), or (viii);
(iv) with (v), (vi), (vii), or (viii).

Also preferred is an embodiment in which the component (B) is formed in whole or in part of styrene and/or its derivatives according to aforementioned group (d).

As a rule, the molecular weight of the copolymers to be used in accordance with the invention will range from $5\times10^4$ to $1\times10^6$, and more particularly from $2\times10^5$ to $5\times10^5$.

Aqueous dispersions of the copolymers may be prepared conventionally by emulsion polymerization. Either the emulsion-addition or the monomer-addition method may be employed, the initial charge consisting of a portion of the water and either the total amount or portions of the initiator and of the emulsifier. In this process, the particle size can be controlled to advantage through the amount of emulsifier in the initial charge. Suitable emulsifiers are, in particular, anionic and non-ionic surfactants. As a rule, the amount of emulsifier used should not exceed 3 weight percent, based on the polymer.

In addition to the compounds commonly used in emulsion polymerization, for example peroxy compounds such as hydrogen peroxide or ammonium persulfate, suitable initiators are redox systems such as bisulfite/ammonium persulfate/iron, as well as azo initiators. The amount of initiator will usually range from 0.005 to 0.5 weight percent, based on the polymer.

To some extent, the polymerization temperature depends on the initiator. For example, when ammonium persulfate is used, polymerization is advantageously carried out in the 60° to 90° C. range. With redox systems, lower temperatures, for example, 30° C., may be used.

In addition to the addition method, the batch method of polymerization may be employed. The initial charge then consists of the total amount or a portion of the monomers with all auxiliary substances, and polymerization is initiated by means of redox systems. The monomer/water ratio should then be based on the reaction heat being liberated. No difficulties will generally be encountered if a 50 percent emulsion is prepared by first emulsifying half of the monomers and of the auxiliary substances in the total amount of the water, then initiating polymerization at room temperature, cooling the batch after the reaction, and adding the other half of the monomers together with auxiliary substances.

The particle diameter of the emulsions used in accordance with the invention will usually range from 0.05 to 5 microns and preferably ranges from 0.1 to 1 micron.

The materials commonly used as molding sands may be conventionally mixed with an aqueous dispersion of a copolymer according to the invention, the amounts used being those required to obtain the desired polymer content. At this stage also the multifunctional non-radically crosslinking agents are admixed. Suitable mixers are forced-motion mixers, for example. In this simple manner, sufficiently free flowing foundry molding sands are generally obtained.

The binders in accordance with the invention for heat curing foundry molding sands meet the aforementioned practical requirements to a surprisingly high degree. From both an ecological and an economic point of view, they represent a particularly happy solution.

Among their advantageous properties are high dimensional accuracy of the molds and cores made with them; good erosion resistance; hardness and handleability of the cores after removal, even while still warm; an unusually smooth and pore-free surface and correspondingly perfect castings; no need for cleaning the castings; and reusability of the molding sands.

Particularly surprising is that there is very little evolution of noxious gases, or of gases generally, in the use of the molding sands.

A better understanding of the invention and of its many advantages will be had by referring to the following specific Examples, given by way of illustration.

EXAMPLE 1

Preparation of a copolymer dispersion

In a 2-liter Witt jar equipped with reflux condenser, stirrer, and feed vessel, 1.4 g of ammonium persulfate and 0.35 g of sodium lauryl sulfate were dissolved in 1440 g distilled water at 80° C. A monomer/emulsifier mixture previously prepared from 180 g of ethyl acrylate, 120 g of methyl methacrylate, 300 g of methacrylic acid, 1.2 g of 2-ethylhexyl thioglycolate, and 14 g of polyoxyethylene/sorbitan monooleate was added dropwise to the resulting solution over a period of 4 hours at 80° C. with stirring, and the resulting mixture was maintained at 80° C. for 2 hours. After cooling to room temperature, it was filtered through a close meshed stainless steel woven wire screen.

The low viscosity dispersion had a dry solids content of 30 percent. The copolymer contained 50 percent of methacrylic acid, 30 percent of ethyl acrylate, and 20 percent of methyl methacrylate by weight, had a molecular weight of about 200,000, a minimum film forming temperature (DIN 53787) of 56° C., and a glass transition temperature, $T_{\lambda max}$ (DIN 53445/DIN 7724) of 157° C.

EXAMPLE 2

The procedure of Example 1 is used, except that the monomer/emulsifier mixture previously prepared consists of
  180 g of ethyl acrylate
  102 g of methyl methacrylate
  18 g of methacrylamide
  300 g of methacrylic acid
  1.2 g of 2-ethylhexyl thioglycolate and
  14 g of polyoxyethylene/sorbitan monooleate
The low viscosity dispersion had a dry solids content of 30 percent. The copolymer had a molecular weight of about 200 000, a minimum film forming temperature (DIN 53 787) of 54° C., and a glass transition temperature $T_{\lambda max}$ (DIN 53 445/DIN 7724) of 156° C.

EXAMPLE 3

The procedure of Example 1 is used, except that the monomer/emulsifier mixture previously prepared consists of
  300 g of methacrylic acid
  180 g of ethyl acrylate
  90 g of methyl methacrylate
  30 g of N-vinyl pyrrolidone
  1.2 g of 2-ethylhexyl thioglycolate and
  14 g of polyoxyethylene/sorbitan monooleate
The low viscosity dispersion had a molecular weight of about 200 000, a dry solids content of 30.5 percent, a minimum film forming temperature (DIN 53 787) of 42° C. and a glass transition temperature. $T_{\lambda max}$ (DIN 53 445/DIN 7724) of 151° C.

EXAMPLE 4

The procedure of Example 1 is used, except that 2.8 g of ammonium persulfate are employed instead of 1.4 g. Moreover the monomer/emulsifier mixture previously prepared consists of
  300 g of methacrylic acid
  180 g of ethyl acrylate
  120 g of styrene
  1.2 g of 2-ethylhexyl thioglycolate and
  14 g of polyoxyethylene/sorbitan monooleate
The low viscosity dispersion had a dry solids content of about 29.5 percent. The copolymer had a molecular weight of about 150 000, a minimum film forming temperature (DIN 53 787) of 53° C., and a glass transition temperature $T_{\lambda max}$ (DIN 53 445/DIN 7724) of 151° C.

EXAMPLE 5

The procedure of Example 1 is used, except that the monomer/emulsifier mixture previously prepared consists of
  300 g of methacrylic acid
  120 g of methyl methacrylate
  180 g of ethylacrylate
  1.2 g of 2-ethylhexyl thioglycolate and
  14 g of polyoxyethylene/sorbitan monooleate
After the reaction was completed, the reaction mixture is cooled to room temperature. Thereafter 12.3 g of an aqueous solution containing 25 percent of ammonia are added. Further work up as in Example 1. The copolymer had a minimum film forming temperature (DIN 53 787) of 52° C. and a glass transition temperature $T_{\lambda max}$ (DIN 53 445/DIN 7724) of 154° C.

EXAMPLE 6

In a 2-1 Witt jar as used in Example 1, 1.4 g of ammonium persulfate and 0.2 g of the sodium salt of a sevenfold methylated and sulfated triisobutyl phenol were dissolved in 580 g of distilled water.

A monomer/emulsifier mixture previously prepared from 258 g of methacrylic acid, 42 g of itaconic acid, 180 g of ethylacrylate, 120 g of methyl methacrylate, 9 g of the emulsifier used before, 2.8 g of ammonium persulfate and 860 g distilled water was added dropwise to the above solution over a period of 4 hours at 80° C. with stirring, and the resulting mixture was maintained at 80° C. for 2 hours. After cooling to room temperature, it was filtered through a close meshed stainless steel woven wire screen.

The low viscosity dispersion had a dry solids content of 29.7 percent. The copolymer had a molecular weight of about 200 000, a minimum film forming temperature (DIN 53 787 of 58° C., and a glass transition temperature. $T_{\lambda max}$ (DIN 53 445/DIN 7724) of 158° C.

EXAMPLE 7

The procedure of Example 1 is used except that the monomer/emulsifier mixture previously prepared consists of
- 120 g of methacrylic acid
- 120 g of acrylic acid
- 360 g of methyl methacrylate
- 1.2 g of 2-ethylhexyl thioglycolate
- 14 g of polyoxyethylene/sorbitan monooleate The low viscosity dispersion had a molecular weight of about 200 000, a dry solids content of about 29.9 percent, a minimum film forming temperature (DIN 53 787) of 50° C., and a glass transition temperature $T_{\lambda max}$ (DIN 53 445/DIN 7724) of 157° C.

In place of ethyl acrylate in Examples 1-6, a vinylether or vinyl ester, e.g. vinylacetat or butadiene can be employed in such quantities as to ensure a $T_{\lambda max}$ of >140° C. of the copolymer. Usually the quantities of such monomers will be below 30 percent by weight of the copolymer.

EXAMPLE 8

In a 2-liter Witt jar as in Example 1, 4.2 g of ammonium persulfate and 1.05 g sodium lauryl sulfate were dissolved in 4300 g distilled water at 80° C. A monomer/emulsifier mixture previously prepared from 900 g of methacrylic acid, 360 g of ethyl acrylate, 360 g of methylmethacrylate, 180 g of hydroxyethyl acrylate, 42 g of polyoxyethylene/sorbitan monooleate and 3.6 g of 2-ethylhexyl thioglycolate was added dropwise to the resulting solution over a period of 4 hours at 80° C. with stirring and the resulting mixture was maintained at 80° C. for 2 hours. After cooling to room temperature, it was filtered through a close meshed stainless steel woven wire screen.

The low viscosity dispersion has a dry solids content of 30 percent. The copolymer has a molecular weight of about 250 000, a minimum film forming temperature (DIN 53 787) of 50° C. and a glass transition temperature $T_{\lambda max}$ (DIN 53 445/DIN 7724) of 146° C.

EXAMPLE 9

The procedure of Example 8 is used except that 4250 g of distilled water are used. Furthermore the monomer/emulsifier mixture, which was prepared previously and is then added, consists of
- 900 g of methacrylic acid
- 504 g of ethyl acrylate
- 306 g of methyl methacrylate
- 90 g of N-methylol methacrylamide
- 3.6 g of 2-ethylhexyl thioglycolate
- 42 g of polyoxyethylene/sorbitan-monooleate
- 6 g of distilled water The low viscosity dispersion has a dry solids content of 30 percent.

The copolymer has a molecular weight of about 270 000, a minimum film forming temperature (DIN 53 787) of 57° C., and a glass transition temperature $T_{\lambda max}$ (DIN 53 445/DIN 7725) of 150° C.

EXAMPLE 10

The same procedure as in Example 9 was used except that 90 g of N-butoxymethyl methacrylamide was used in place of N-methylol methacrylamide. The physical data of the copolymer are rather similar to the ones of Example 9.

Other copolymers having a different monomeric composition may be prepared in the same manner.

EXAMPLE 11

Preparation of a molding sand mixture ready for use 97 kg of foundry molding quartz sand were mixed at room temperature in a forced-motion mixer with 3 parts by weight of an aqueous acrylic resin dispersion containing 30 percent of the copolymer of Example 1. In this way, a sufficiently free-flowing, ready-to-use foundry molding sand mixture was obtained.

EXAMPLE 12

Preparation of a molding sand mixture with addition of a multifunctional non-radically crosslinking agent 3 kg of dry foundry molding quartz sand were thoroughly mixed at room temperature with 3 g (0.1 percent by weight) of a finely powdered solid epoxy resin in a forced-motion mixer. The resin had an average particle size of about 20 microns and is a solid bisphenol A-epichlorohydrin epoxy resin with an epoxy equivalent of 450-500 g, a viscosity at 25° C. of 1.2-1.7 poise, and a deformation temperature of 50°-70° C. It is commercially available under the tradename EPIKOTE 1001.

Then 90 g (3 percent by weight) of an aqueous dispersion of the copolymer of Example 1 or, alternatively, Example 8 are admixed in homogeneous distribution.

EXAMPLE 13

Production of a foundry mold core from a sand mixture

The molding sand mixture of Example 1 or Example 12 was blown by compressed air into an iron mold which had a temperature between 150° and 200° C. The filled mold was held for about 0.5 to 3 minutes at that temperature. Then it was opened while hot and the foundry core was removed. It was perfectly stable, retained its shape, and withstood handling.

EXAMPLE 14

Production of a metal casting

The mold core of Example 13 was introduced into and secured in a box mold for iron casting. Iron was then poured into the mold. On cooling, a casting with a hollow which had the dimensions of the core of Example 13 was obtained. The core had completely collapsed. No gas evolution occurred on contact with the liquid iron. The casting was practically free of pores.

EXAMPLE 15

5% (based on the total dispersion) of a monomer/initiator mixture consisting of trimethylolpropane trimethacrylate and up to 20%, based on the trimethylolpropane trimethacrylate, of tert-butyl perbenzoate or, alternatively, of a commercially available peroxide-free initiator ("Akzo-Starter 407") was stirred into an acrylic resin dispersion as in Example 1. This mixture was processed further in the same concentration as in Examples 1 to 14.

Here, too, hard and handleable shaped bodies were obtained which exhibited no tendency toward gas evolution.

What is claimed is:

1. A ready-to-use foundry molding sand composition which is a mixture of sand and such an amount of an aqueous dispersion containing from 10 to 60 percent by weight of a water insoluble synthetic resin copolymer that said mixture contains from 0.1 to 10 percent by weight of said copolymer, said copolymer comprising (A) from 20 to 90 percent by weight of an unsaturated carboxylic acid of the formula

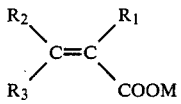

wherein $R_1$, $R_2$ and $R_3$ are independently hydrogen, alkyl having from 1 to 6 carbon atoms, or $-(CH_2)_n-COOM$, where M is a proton or an alkali metal or alkaline earth metal or an ammonium cation, and n is 0 or 1, but where no more than two $-COOM$ groups are present in the acid molecule and where those groups $-COOM$ wherein M is an alkali metal or alkaline earth metal cation are not more than 20 percent by weight of all $-COOM$ groups present in said copolymer; and (B) from 10 to 80 percent by weight of at least one monomer different from and copolymerizable with (A).

2. A foundry sand composition as in claim 1 wherein said copolymer has a minimum film forming temperature below 100° C. and a glass transition temperature greater than 140° C.

3. A foundry sand composition as in claim 2 wherein said copolymer has a glass transition temperature greater than 150° C.

4. A foundry sand composition as in claim 1 wherein (B) comprises at least one ester or amide of acrylic acid or of methacrylic acid.

5. A foundry sand composition as in claim 1 wherein component (A) is from 20 to 50 percent by weight of said copolymer.

6. A foundry sand composition as in claim 1 wherein components (A) and (B) are present in a weight ratio of 1:1.

7. A ready-to-use foundry molding sand composition which is a mixture of sand and such an amount of an aqueous dispersion containing about 10 to 60 percent by weight of a water insoluble synthetic resin copolymer that said mixture contains from 0.1 to 10 percent by weight of said copolymer, said copolymer comprising (A) from 20 to 90 percent by weight of an unsaturated carboxylic acid of the formula

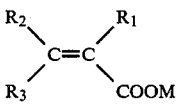

wherein $R_1$, $R_2$ and $R_3$ are independently hydrogen, alkyl having from 1 to 6 carbon atoms, or $-(CH_2)_n-COOM$, where M is a proton or an alkali metal or alkaline earth metal or an ammonium cation, and n is 0 or 1, but where no more than two $-COOM$ groups are present in the acid molecule and where those groups $-COOM$ wherein M is an alkali metal or alkaline earth metal cation are not more than 20 percent by weight of all $-COOM$ groups present in said copolymer; and (B) from 10 to 80 percent by weight of one or more monomers different from and copolymerizable with (A) and having the same or different functional groups capable of non-radical addition of condensation crosslinking reaction with each other at a temperature above 60° C.

8. A molding sand composition as in claim 7 wherein said monomers containing a functional group capable of non-radical crosslinking are from 0.3 to 30 percent by weight of said copolymer.

9. A molding sand composition as in claim 7 wherein said functional groups are selected from the group consisting of unsubstituted amide, N-methylolamide, alcoholic hydroxy, epoxy and blocked isocyanate functions.

10. A molding sand composition as in claim 9 wherein said monomers containing a functional group capable of non-radical crosslinking are of the formula $$H_2C=C(R_4')-Y,$$

wherein $R_4'$ is hydrogen or methyl, Y is $-NH-CH_2OH$, $-NHCH_2OR_{11}$, or $Q-R_{14}-Z$, wherein Q is oxygen or $-NHR_{12}$, R is a hydrocarbon chain having 1 to 8 carbon atoms, Z is $-OH$,

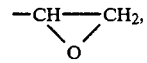

or $-NHR_{13}$, and $R_{11}$, $R_{12}$, and $R_{13}$ are each alkyl having 1 to 8 carbon atoms.

11. A ready-to-use foundry molding sand composition which is a mixture of sand, such an amount of an aqueous dispersion containing from 10 to 60 percent by weight of a water-insoluble synthetic resin copolymer that said mixture contains from 0.1 to 10 percent by weight of said copolymer, and a multifunctional non-radically crosslinking agent for said copolymer, said copolymer comprising (A) from 20 to 90 percent by weight of an unsaturated carboxylic acid of the formula

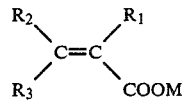

wherein $R_1$, $R_2$ and $R_3$ are independently hydrogen, alkyl having from 1 to 6 carbon atoms, or $-(CH_2)_n-COOM$, where M is a proton or an alkali metal or alkaline earth metal or an ammonium cation, and n is 0 or 1, but where no more than two $-COOM$ groups are present in the acid molecule and where those groups $-COOM$ wherein M is an alkali metal or alkaline earth metal cation are not more than 20 percent by weight of all $-COOM$ groups present in said copolymer; and (B) from 10 to 80 percent by weight of one or more monomers different from and copolymerizable with (A) and having the same or different functional groups capable of non-radical addition or condensation crosslinking reaction with said multifunctional crosslinking agent at a temperature above 60° C.

12. A molding sand composition as in claim 11 wherein said monomers containing a functional group capable of non-radical crosslinking are from 0.3 to 30 percent by weight of said copolymer.

13. A molding sand composition as in claim 11 wherein said functional groups are selected from the group consisting of unsubstituted amide, N-methylolamide, alcoholic hydroxy, epoxy and blocked isocyanate functions.

14. A molding sand composition as in claim 11 wherein said monomers containing a functional group capable of non-radical crosslinking are of the formula $$H_2C=C(R_4')-Y,$$

wherein $R_4'$ is hydrogen or methyl, Y is $-NH-CH_2OH$, $-NHCH_2OR_{11}$, or $-Q-R_{14}-Z$, wherein Q is oxygen or $-NHR_{12}$, $R_{14}$ is a hydrocarbon chain having 1 to 8 carbon atoms, Z is $-OH$,

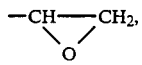

or $-NHR_{13}$, and $R_{11}$, $R_{12}$, and $R_{13}$ are each alkyl having 1 to 8 carbon atoms.

15. A foundry sand composition as in claim 14 wherein said multifunctional non-radically crosslinking agent contains a hydrocarbon backbone having from 2 to $10^3$ carbon atoms with a minimum of 2 functional groups and a maximum number of functional groups equal to the number of carbon atoms in the backbone.

16. A foundry sand composition as in claim 15, wherein said multifunctional non-radically crosslinking agent consists of a hydrocarbon backbone having from 2 to 20 carbon atoms with a minimum of 2 functional groups and a maximum number of functional groups equal to the number of carbon atoms in the backbone.

17. A ready-to-use foundry molding sand composition which is a mixture of said, such an amount of an aqueous dispersion containing from 10 to 60 percent by weight of a water insoluble synthetic resin copolymer that said mixture contains from 0.1 to 10 percent by weight of said copolymer, from 1 to 10 percent, by weight of said copolymer, of a radically crosslinking monomer having a boiling point of at least 150° C., and from 0.1 to 5 percent, by weight of said crosslinking monomer, of a free radical polymerization initiator soluble in said radically crosslinking monomer, said copolymer comprising (A) from 20 to 90 percent by weight of an unsaturated carboxylic acid of the formula

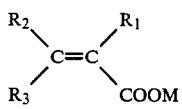

wherein $R_1$, $R_2$ and $R_3$ are independently hydrogen, alkyl having from 1 to 6 carbon atoms, or $-(CH_2)_n-COOM$, where M is a proton or an alkali metal or alkaline earth metal or an ammonium cation, and n is 0 or 1, but where no more than two $-COOM$ groups are present in the acid molecule and where those groups $-COOM$ wherein M is an alkali metal or alkaline earth metal cation are not more than 20 percent by weight of all $-COOM$ groups present in said copolymer; and (B) from 10 to 80 percent by weight of at least one monomer different from and copolymerizable with (A).

* * * * *